G. E. STEVENS.
ELECTRIC METER.
APPLICATION FILED AUG. 31, 1905.

988,042.

Patented Mar. 28, 1911.
4 SHEETS—SHEET 1.

Witnesses:
Harry N. Tilden
Helen Oxford

Inventor,
George E. Stevens,
By Albert G. Davis
Att'y.

G. E. STEVENS.
ELECTRIC METER.
APPLICATION FILED AUG. 31, 1905.

988,042.

Patented Mar. 28, 1911.

4 SHEETS—SHEET 2.

Witnesses:
Harry W. Tilden
Arthur Oxford

Inventor,
George E. Stevens,
By Albert G. Davis
Atty.

G. E. STEVENS.
ELECTRIC METER.
APPLICATION FILED AUG. 31, 1905.

988,042.

Patented Mar. 28, 1911.
4 SHEETS—SHEET 3.

Witnesses:

Inventor,
George E. Stevens
By Albert H. Davis
Atty.

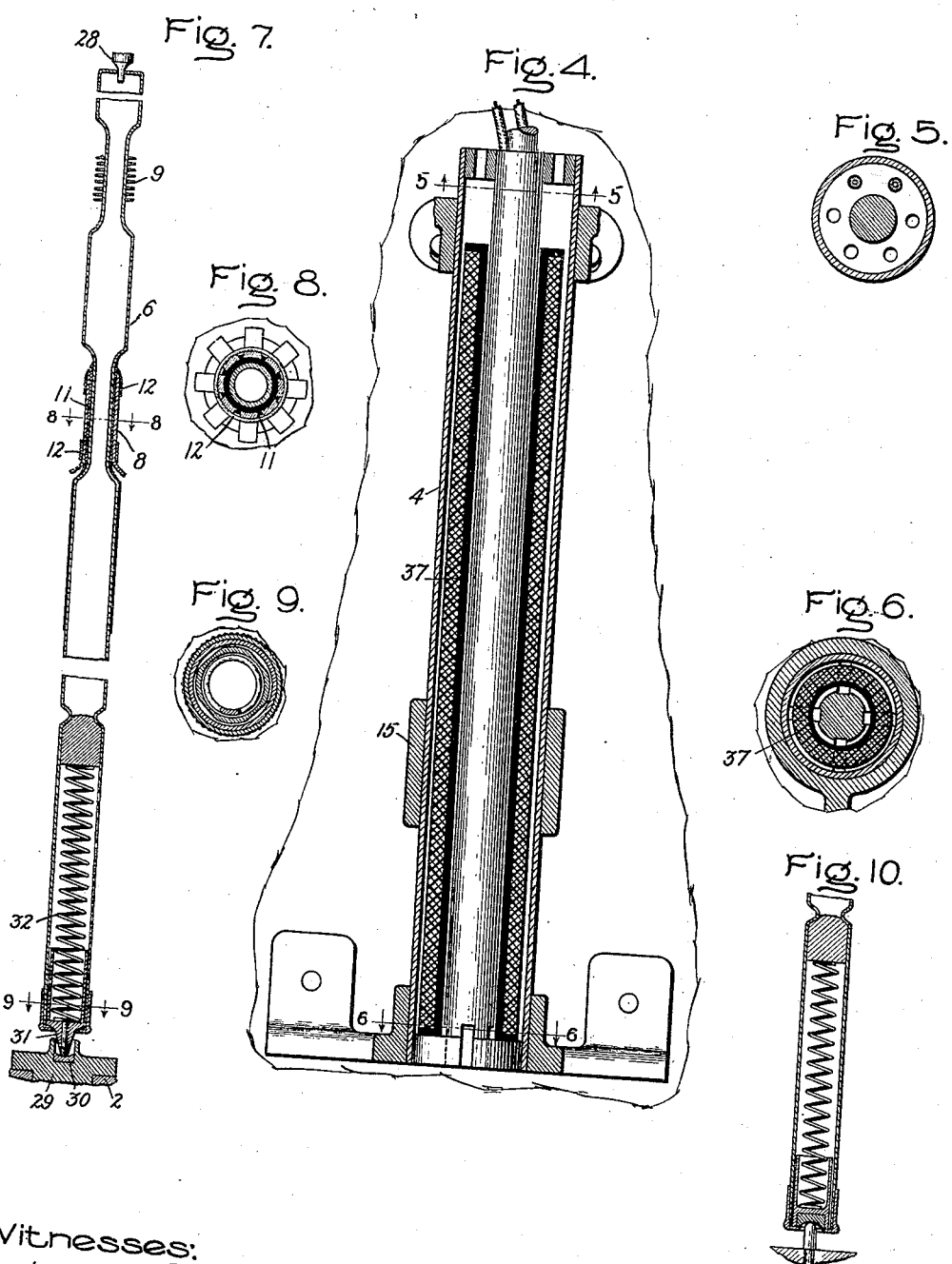

UNITED STATES PATENT OFFICE.

GEORGE E. STEVENS, OF LYNN, MASSACHUSETTS, ASSIGNOR TO GENERAL ELECTRIC COMPANY, A CORPORATION OF NEW YORK.

ELECTRIC METER.

988,042.

Specification of Letters Patent. Patented Mar. 28, 1911.

Application filed August 31, 1905. Serial No. 276,503.

*To all whom it may concern:*

Be it known that I, GEORGE E. STEVENS, a citizen of the United States, residing at Lynn, county of Essex, State of Massachusetts, have invented certain new and useful Improvements in Electric Meters, of which the following is a specification.

This invention relates to electric meters and more particularly to integrating electric meters of the commutating motor type.

The object of the invention is to effect certain improvements in meters of this type whereby the construction is simplified and strengthened, the cost of production reduced and the general operation of the meter under all the conditions of use improved.

The novel features of my invention will be definitely indicated in the claims appended hereto.

The details of construction and the mode of operation of my improved meter will be better understood by reference to the following description taken in connection with the accompanying drawings which show the preferred embodiment of the invention and in which—

Figure 1:
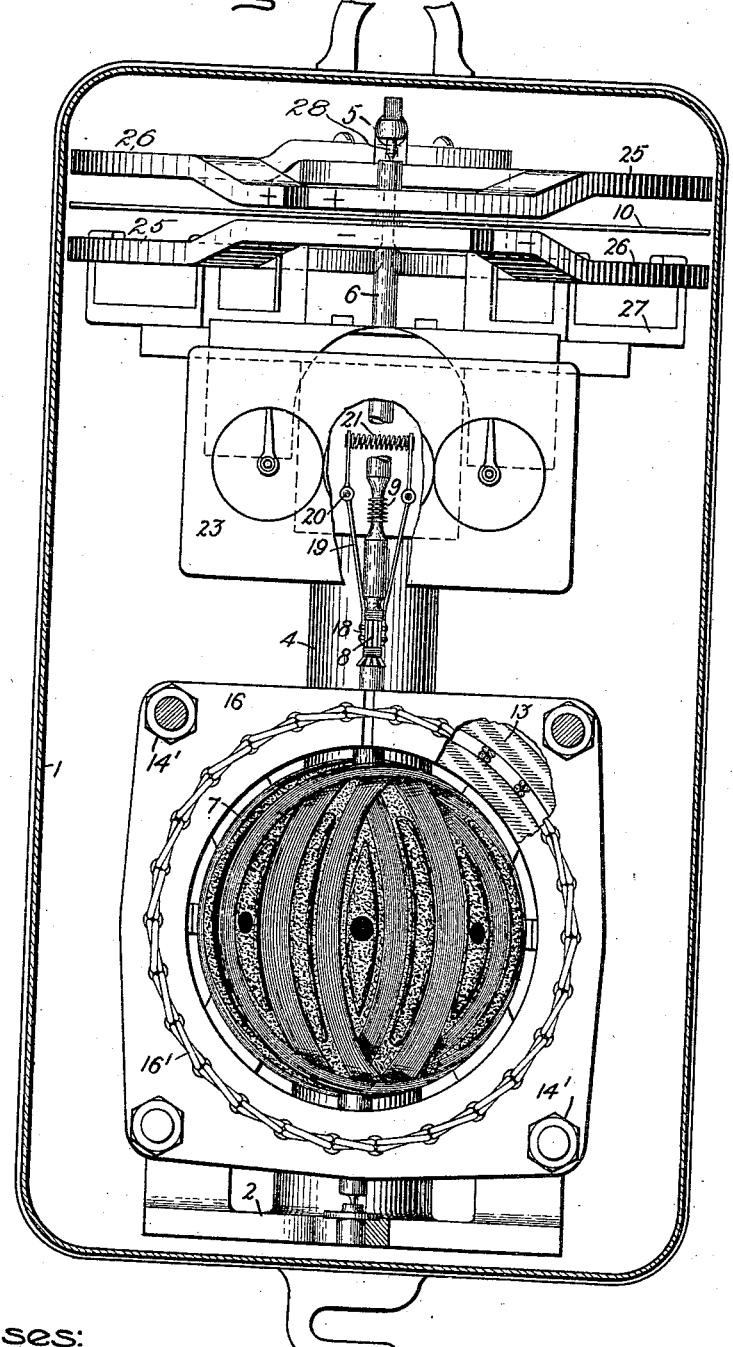
Figure 2:
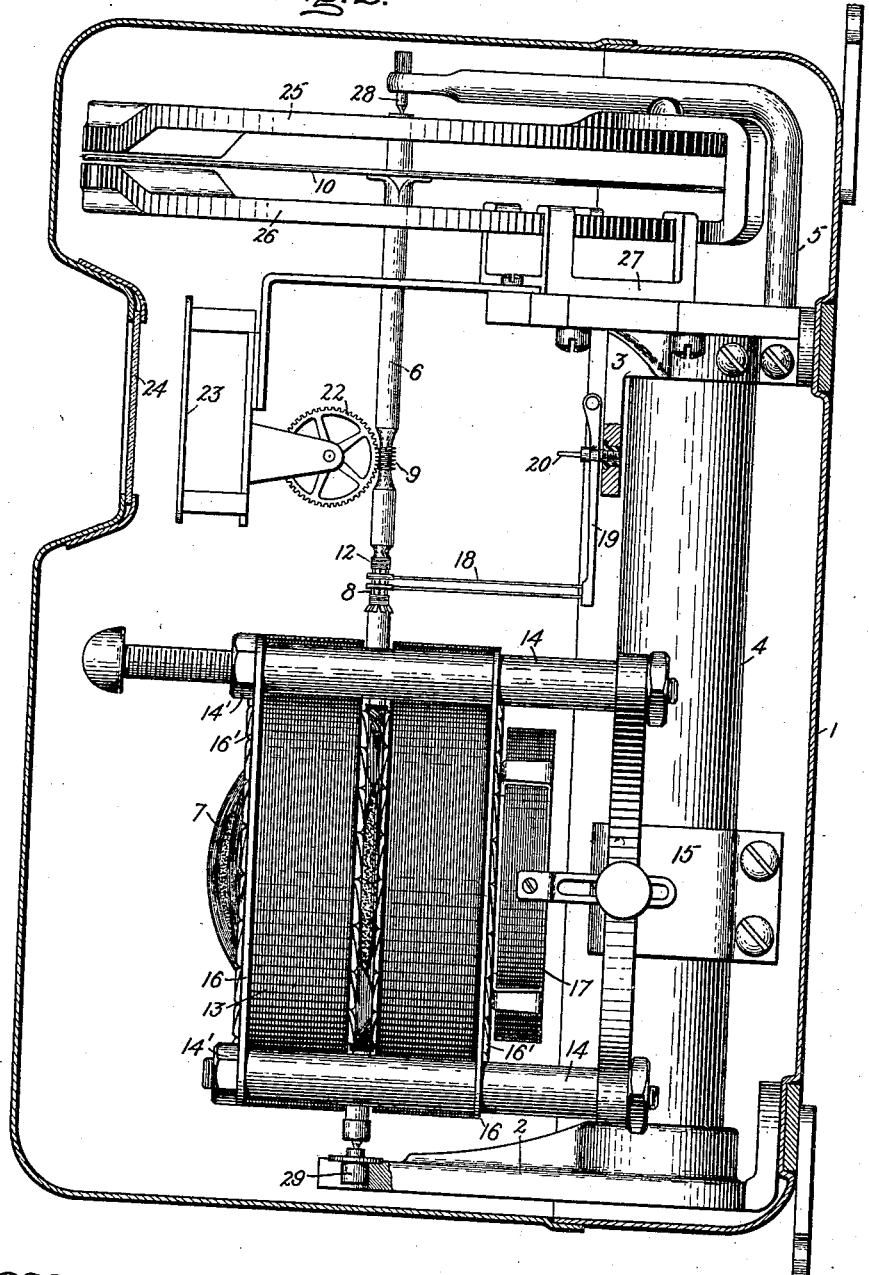
Figure 3:
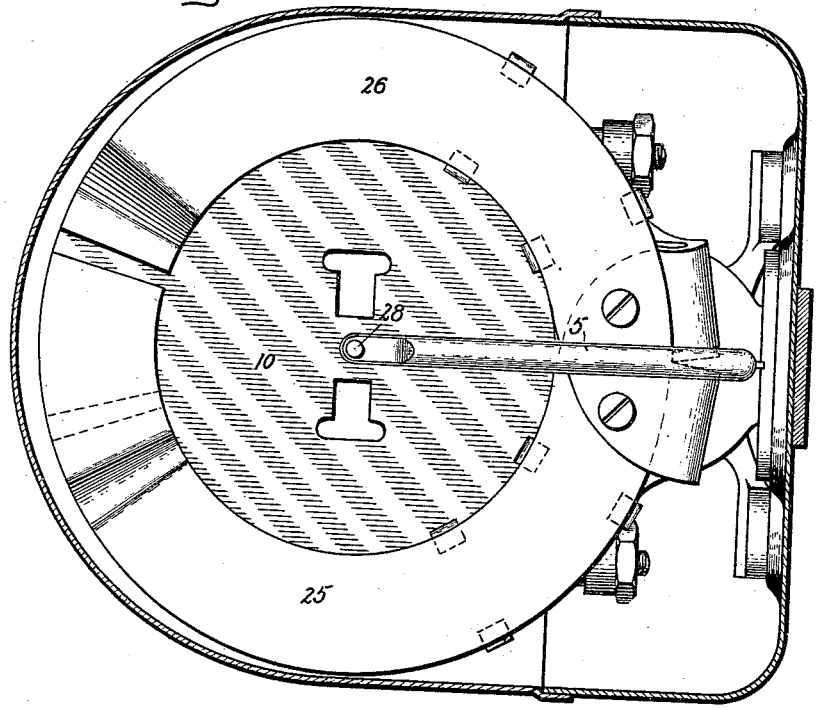
Figure 11:
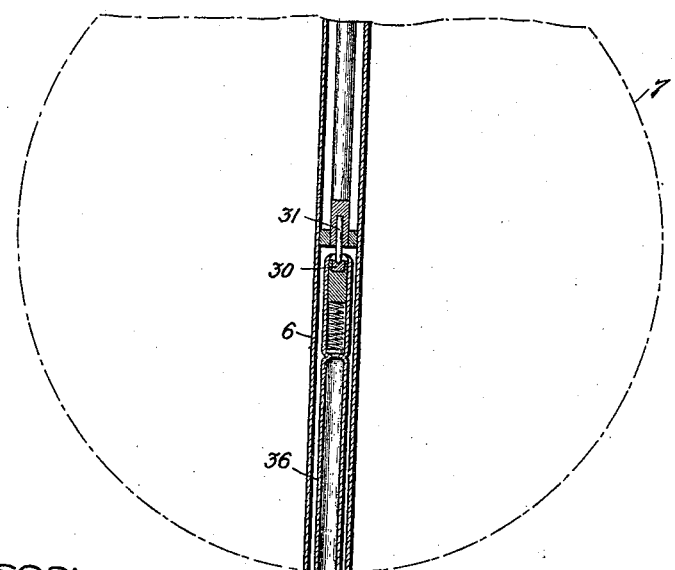

Figures 1, 2 and 3 are front, side and top views, respectively, of the meter with the casing in section; Fig. 4 is a section of the supporting tube; Figs. 5 and 6 are sections on lines 5—5 and 6—6, respectively, of Fig. 4; Fig. 7 is a section of the shaft; Figs. 8 and 9 are sections on lines 8—8 and 9—9, respectively, of Fig. 7; Fig. 10 is a section of a modified form of lower bearing; and Fig. 11 is a section of a further modification of the lower bearing.

Referring to the drawings, the meter is inclosed within a suitable casing 1 consisting of a back and cover having supports secured thereto for fastening the meter to a wall or panel. Secured to the back of the meter are two supporting arms 2 and 3 carrying a large metallic tube 4, and all the parts of the meter are supported on these arms and the tube so that they can be readily assembled in position and the supporting structure then secured to the casing. In the outer end of arm 2 and in the outer end of an arm 5 carried by the support 3 are bearings for the shaft 6 of the meter which carries the armature 7 and commutator 8 of the motor, the worm 9 which drives the register and the disk 10 of the damping mechanism. The armature 7 is preferably of spherical conformation and consists of a hollow supporting member having projections thereon and armature coils wound about the supporting member and spaced apart by the projections, leads being taken off from the armature coils for connection to the segments of the commutator. The shaft 6 is preferably of tubular form as shown in Fig. 7 in order to get great strength with light weight and is contracted at the proper positions for the commutator and worm. In the construction of the commutator 8, the contracted portion of shaft 6 is insulated by wrapping fibrous material, preferably silk thread 11 thereon; this thread is then coated with japan or some other suitable insulating compound. The segments of the commutator are then placed in position around this insulated portion of the shaft and are secured thereon by wrappings of silk thread about the ends of the segments as indicated at 12. The thread 12 and the commutator segments may be coated again with the insulating compound if desired, after which the whole is baked until the compound is hard. The surface of the commutator may then be turned down in a suitable machine to make the commutator perfectly cylindrical and if desired some of the insulating compound may be scraped out from between the segments to leave air spaces and to allow for wear. The ends of the armature coils are then connected to the ends of the segments of the commutator in any suitable manner. By this construction the diameter of the commutator can be greatly reduced and a reduction corresponding thereto is thus effected in the friction between the commutator and brushes.

The field coils 13 of the motor are carried by a frame 14 which is secured to the tube 4 by a clamp 15. The coils 13 are preferably circular and are mounted close together and closely encircling the armature 7 so as to reduce to a minimum the number of stray lines of force. The coils are made of ribbon conductor wound on edge with the several turns insulated one from another and each coil consists of two concentric coil sections as shown in Fig. 1. Each of the field coils consisting of the two coil sections is supported between two plates 16 preferably of stiff insulating material, though if desired metallic plates may be used and sheets of insulating material inserted between the coil and the metallic plates. Each of the supporting plates 16 has a circle of holes punched therein and a long thin strip of flexible insulating material such as a cord 16' is laced back and forth through the holes in the two plates and between the two sections of a coil preferably in the manner illustrated in Fig. 1. The cord enters the hole in one of the plates, then passes through the coil between the two coil-sections to the second plate, then out through a hole in the second plate; reëntering through an adjacent hole in the second plate and passing through the coil between the two coil-sections to the first plate, and out through a hole therein. In this manner the cord is carried back and forth through the coil all the way around; binding the two plates to each other and to the coil. This cord is drawn very tight so that the coil is held securely between the two plates; also the cord effectually insulates the two coil sections one from the other and at the same time provides air spaces between them and thus gives good ventilation so that heat is radiated from the coils quite rapidly. One or both of the plates 16 between which each coil 13 is held is extended beyond the coil and openings are provided in these extended portions through which the posts of the frame 14 extend, and nuts 14' secure the coils in position on these posts. In order to compensate for friction in the meter, an auxiliary field coil 17 is mounted on frame 14 in inductive relation to the armature 7 and arranged to be adjustable toward and away from the armature to vary its compensating effect.

Current is led to and from the coils of the armature by brushes 18 bearing on the commutator 8. Each brush 18 is carried by a holder 19 which is pivoted intermediate its ends on a pin 20 mounted in an insulating bushing on the supporting arm 3. In order to hold the brushes against the commutator with the proper tension a spring 21 has its ends secured to the upper ends of the two brush-holders above their pivots and is arranged to press them outward. In this way the brushes are held against the commutator with a light pressure and the pressure of the two brushes is always equal.

The worm 9 instead of being cut from the stock of the shaft is formed by winding a thin metal ribbon on edge helically on the contracted portion of shaft 6 and soldering it thereon. The surplus solder can then be removed with a suitable tool. Worm 9 meshes with a worm-wheel 22 which drives the register 23. The register is mounted on the forward end of arm 3 and a window 24 is provided in the casing in front of the register.

The rotation of the moving element of the meter is retarded by a disk 10 of conducting material which cuts the lines of force of two permanent magnets 25 and 26. Each of these permanent magnets is of flat circular form bent at the middle portion so that approximately half of the magnet is above the disk and the other half below the disk. At the ends the magnets are bent so as to bring their poles in close proximity to the disk 10. The manner in which the magnets are bent so as to be part above and part below the disk 10 is best illustrated in Fig. 3 and the arrangement of the poles of the magnets is shown in Fig. 1. The two poles above the disk are of one polarity and the two below the disk of the opposite polarity and the poles of magnet 25 overlap somewhat so that the air-gap between the two poles above the disk is angularly displaced from the gap between the two poles below the disk. By this construction of the magnets a very broad but short air-gap between the poles of opposite polarity is obtained; also the damping mechanism is very compact and permits of a reduction of the length of the meter. The magnets are held in position by suitable clamps 27 which are mounted on the supporting arm 3.

The upper end of shaft 6 is spun over as shown in Fig. 7 and a small opening, accurately centered, is formed in this turned-over portion to receive the pivot pin 28 of the upper bearing which is secured in an opening in the end of arm 5. Mounted in the outer end of the supporting arm 2 and arranged to be readily removable therefrom is a bearing plug 29 carrying a jewel 30 on which rests a pivot 31 slidingly mounted in the end of the tubular shaft 6 and pressed downward by a helical spring 32 coiled within the shaft so that the moving element of the meter is yieldingly supported.

In Fig. 10 I have shown a modified form of lower bearing in which the jewel is carried by the shaft and supported on a spring and the pivot is mounted in the bearing plug. This arrangement of the parts possesses the advantage that dust will not settle on the jewel and increase the friction in the bearing.

In Fig. 11 I have shown a further modified form of lower bearing in which the bearing point is at the exact center of the armature so that the armature is a sphere revolving on its own center. In this construction the bearing plug consists of a long tube 36 mounted in any suitable manner upon the supporting arm 2 and extending up within the tubular shaft 6. A jewel 30 is supported upon a spring in the upper end of tube 36 and a pivot-pin 31 is mounted within shaft 6, as shown, with its point at the center of the armature 7. The point about which all the movements of the spherical armature are made is therefore the center of the sphere and I have found by experiment that with this arrangement of the parts the wear on the jewel is greatly decreased. In this form of bearing means are provided for lifting the moving element off of the jewel when the meter is to be transported. This consists of a sleeve 33 mounted to slide vertically on the bearing post and a spring 34 arranged to press the sleeve upward to bring it into engagement with the end of shaft 6 and raise the entire moving element. A bail 35 is secured to the sleeve 33 and arranged so that it may be turned to bring the bight of the bail under the end of the arm which carries the bearing plug to hold the sleeve 33 in a retracted position.

In meters of this type it is usual to provide a resistance of large ohmic value which is connected in series with the armature and the friction compensating coil of the meter-motor to cut down the current flowing in the shunt circuit of the meter. I have found that by arranging this resistance within the meter casing so that the heat given off by it when the circuit is closed causes a circulation of air within the casing, all the parts of the operating mechanism of the meter are kept at approximately the same temperature under which condition the meter will operate best. In order to obtain this circulation of air, the resistance may be wound in a cylindrical coil and mounted vertically within the meter casing; I prefer however to employ the tube 4 which is supported in a vertical position and to mount the resistance wire within this tube as shown at 37, Fig. 4. Openings are provided in the ends of tube 4, as shown in Figs. 4, 5 and 6, to permit the free entrance and exit of air and ample space is provided on each side of the coil 37 so that the air when heated by the coil may rise through the tube.

I do not wish to be understood as limited to the exact construction which I have illustrated and described herein as many modifications can be made therein without departing from the spirit of my invention. Such modifications I consider within the scope of my invention and aim to cover them by the terms of the appended claims.

What I claim as new and desire to secure by Letters Patent of the United States, is,—

1. An electric meter comprising a casing, a motor, a register driver thereby and means for retarding the rotation of the moving element of the meter within the casing, a tube open at the ends mounted vertically within the casing, and a resistance in said tube.

2. An electric meter comprising a casing, a tube open at its ends mounted vertically within the casing, a rotatable shaft, an armature carried thereby, a field coil in inductive relation to the armature, a register geared to the shaft, means for retarding the rotation of the shaft, and a resistance coiled within said tube and connected in series with the armature.

3. In a meter, a tubular metallic shaft having two contracted portions therein, commutator segments secured about one of the contracted portions, an armature carried by the shaft having its coils connected to the segments of the commutator, a field coil in inductive relation to the armature, a worm carried by the shaft at the other contracted portion, and a register driven by said worm.

4. In a meter, an armature, a field coil in inductive relation thereto, a plate on each side of the coil, and a lacing of insulating material holding the plates and coil tightly together.

5. In a meter, an armature, a field coil, a plate on each side of the coil, a lacing of insulating material holding the plates and coil tightly together, and a frame to which one of the plates is secured to hold the coil in inductive relation to the armature.

6. In a meter, an armature, a field coil in inductive relation thereto consisting of a plurality of concentric coil sections, a support for the coil, and a lacing of insulating material securing the coil to the support and spacing the coil sections apart.

7. In a meter, an armature, a field coil in inductive relation thereto consisting of a plurality of concentric coil sections, a plate on each side of the coil, and a lacing of insulating material extending between the coil sections and holding the plates and coil tightly together.

8. In a meter, an armature, a field coil of ribbon conductor wound on edge mounted in inductive relation thereto, a plate on each side of the coil, and a lacing of insulating material holding the plates and coil tightly together.

9. In a meter, an armature, a field coil in inductive relation thereto consisting of a plurality of concentric coil sections of ribbon conductor wound on edge with the turns insulated one from another, a plate on each side of the coil, and a lacing of insulating material extending between the coil sections and holding the plates and coil tightly together.

10. In a meter, an armature, a field coil in inductive relation thereto consisting of a plurality of concentric coil sections of ribbon conductor wound on edge, a plate on each side of the coil, and a cord laced back and forth between the two plates and between the coil sections to hold the plates and coil tightly together and space the coil sections apart.

11. In an electric measuring instrument, a moving element and means for retarding the movement thereof comprising a plate of conducting material carried by the shaft of the moving element and a flat circular permanent magnet coöperating with the plate the poles of which overlap and which is bent intermediate its ends so that part of the magnet is on one side and part on the other side of said plate.

12. In an electric measuring instrument, a moving element, and means for retarding the movements thereof comprising a disk of conducting material carried by the shaft of the moving element and two flat circular permanent magnets coöperating with the disk each of which is bent intermediate its ends so that the legs of the magnet lie in different planes, the magnets being so mounted that the poles of one polarity are on one side of the disk and the poles of the opposite polarity on the other side of the disk.

In witness whereof, I have hereunto set my hand this twenty eighth day of August, 1905.

GEORGE E. STEVENS.

Witnesses:
JOHN A. McMANUS, Jr.,
ROBERT SHAND.

Copies of this patent may be obtained for five cents each, by addressing the "Commissioner of Patents, Washington, D. C."